US007024752B2

(12) United States Patent

Imgrüt et al.

(10) Patent No.: US 7,024,752 B2

(45) Date of Patent: Apr. 11, 2006

(54) CRIMPING PRESS WITH CONTACT FEED

(75) Inventors: Peter Imgrüt, Baar (CH); Claudio Meisser, Cham (CH)

(73) Assignee: Komax Holding AG, Dierikon (CH)

( * ) Notice: Subject to any disclaimer, the term of this patent is extended or adjusted under 35 U.S.C. 154(b) by 312 days.

(21) Appl. No.: 10/612,451

(22) Filed: Jul. 2, 2003

(65) Prior Publication Data

US 2004/0007041 A1 Jan. 15, 2004

(30) Foreign Application Priority Data

Jul. 10, 2002 (EP) ................................ 02405585

(51) Int. Cl.
*B23P 23/00* (2006.01)

(52) U.S. Cl. ........................ 29/566.2; 29/448; 29/566; 29/593; 29/751; 29/760; 29/863; 72/21.4; 72/192; 72/197; 72/413; 72/414; 72/421; 72/712

(58) Field of Classification Search ................. 29/448, 29/566, 566.2, 593, 751, 760, 863; 72/21.4, 72/192, 197, 413, 414, 421, 712
See application file for complete search history.

(56) References Cited

U.S. PATENT DOCUMENTS

| | | | | |
|---|---|---|---|---|
| 4,784,262 A * | 11/1988 | Duddy et al. | ............... | 206/716 |
| 5,101,651 A | 4/1992 | Yeomans | | |
| 5,706,570 A * | 1/1998 | Inoue et al. | ............... | 29/566.2 |
| 6,067,828 A * | 5/2000 | Bucher et al. | ............... | 72/21.4 |
| 6,161,407 A | 12/2000 | Meisser | | |
| 6,212,924 B1 | 4/2001 | Meisser | | |
| 6,694,795 B1 * | 2/2004 | Quinn | ......................... | 72/420 |
| 2001/0047674 A1 | 12/2001 | Meisser et al. | | |

FOREIGN PATENT DOCUMENTS

| | | |
|---|---|---|
| DE | 43 37 797 | 5/1995 |
| EP | 0 184 204 | 6/1986 |
| EP | 0 500 217 | 8/1992 |
| EP | 0 884 811 | 12/1998 |
| EP | 0 902 509 | 3/1999 |

* cited by examiner

*Primary Examiner*—Derris H. Banks
*Assistant Examiner*—Hung C. Le
(74) *Attorney, Agent, or Firm*—Butzel Long

(57) ABSTRACT

A crimping press has a tool receptacle arranged at a lower end of a pressing slider provided with a force-sensing device. The forces arising during the crimping operation are transmitted from the supporting surfaces of an upper tool to several points on the force-sensing device. Provided on each side of an upper fork and held by screws are two collars to which are transmitted, the crimping forces on either side of the supporting surface. With their heads, the screws hold the collars, while with their other ends the screws are engaged with the pressing slider. The collars transmit the crimping forces to the sensor elements of the force-sensing device.

14 Claims, 9 Drawing Sheets

CRIMPING PRESS WITH CONTACT FEED

BACKGROUND OF THE INVENTION

The present invention relates to a crimping press for producing a crimped connection by means of an upper tool and a lower tool, in which the upper tool moves in a linear motion to crimp onto an end of a conductor a crimp contact which can be laid on the lower tool.

The European patent specifications EP 0 884 811 and EP 0 902 509 show a crimping press having a motor and a gear arranged on a stand. Also arranged on the stand are first guides on which a crimping bar is guided. A shaft which is driven by the gear has at one end an eccentric pin, and at the other end a resolver for detection of the rotational angle. The crimping bar consists of a slide which is guided in the first guides, and a toolholder with a force sensor and a holding fork. The slide is loosely connected to the eccentric pin, whereby rotational motion of the eccentric pin is converted into a linear motion of the slide. The maximum stroke of the slide is determined by the upper dead point and lower dead point of the eccentric pin. The toolholder actuates a tool which, together with an anvil forming part of the tool, produces the crimped connection. The tool has a die-carrier with a carrier-head which is loosely connected to the holder fork. Arranged on the die holder are a first crimping die and a second crimping die, which together with the correspondingly formed anvil produce the crimped connection.

A disadvantage of this known device is that the die-carrier which is guided in the tool housing causes forces by friction, or that other forces can arise as a result of jamming, and that the forces distort the measurement of the crimping force.

SUMMARY OF THE INVENTION

The apparatus according to the present invention provides a solution for avoiding the disadvantages of the above-described known device, and creates a crimping press whose upper tool does not generate any frictional forces caused by guides.

In the crimping press according to the present invention, the upper tool with a crimping die is a unit that can be attached directly to the pressing slider. The lower tool with an anvil and a contact advance, the contact roll, and the contact feeder are contained in a cassette which forms an interchangeable insert. The crimp contacts are fed to the crimping tool in the form of an arc, which causes the crimping press to be narrow. The lateral space requirements for a crimping press are approximately halved, and the changeover time is substantially reduced. On account of the mechanical separation of the upper tool from the lower tool, the contact belt no longer has to be unthreaded. On the crimping press according to the present invention, the crimping height is programmable (variable dead point). This also dispenses with the manual adjustment of the crimping height and the crimping tool which is necessary on conventional tools.

Integrated into the receptacle for the pressing slider in the upper tool is a force sensor to monitor the crimping force. On conventional tools, this force-monitoring sensor must be built in either above the coupling between the pressing slide and the tool, or under the baseplate of the tool. This has the consequence that as well as the actual crimping forces, other forces (contact advance, cutting forces for separating the contact from the carrier belt, friction, jamming, etc.) are measured along with them. By contrast, in the crimping-press concept according to the present invention, only those forces relevant for evaluating the quality of the crimping are measured. With the arrangement of the upper tool according to the invention, and the innovative measurement of crimping force associated with the arrangement, the true crimping forces can be registered, which in turn allows more accurate statements regarding the quality of crimping.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
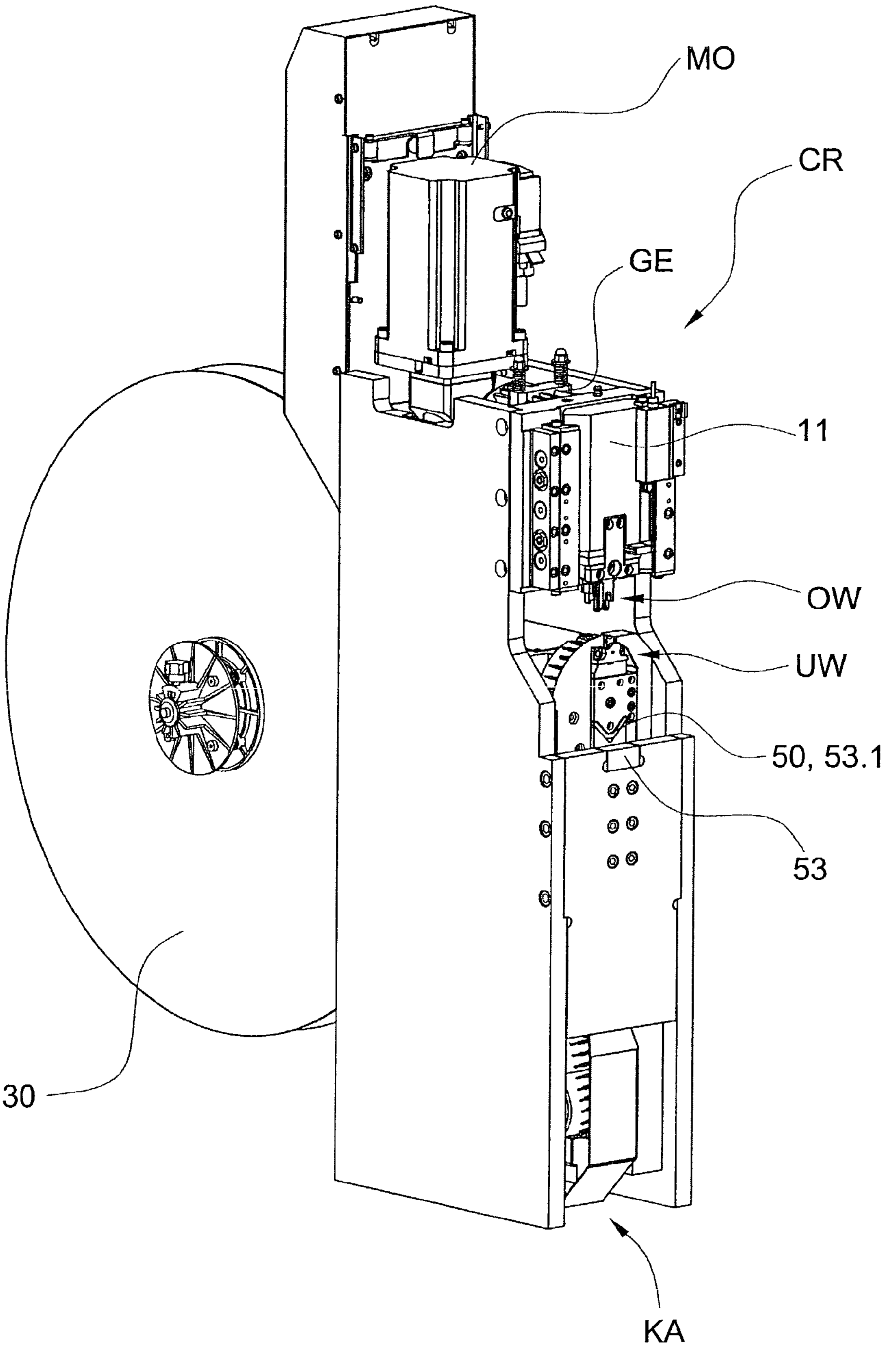
FIG. 1 is a perspective view of a crimping press in accordance with the present invention.
Figure 2:
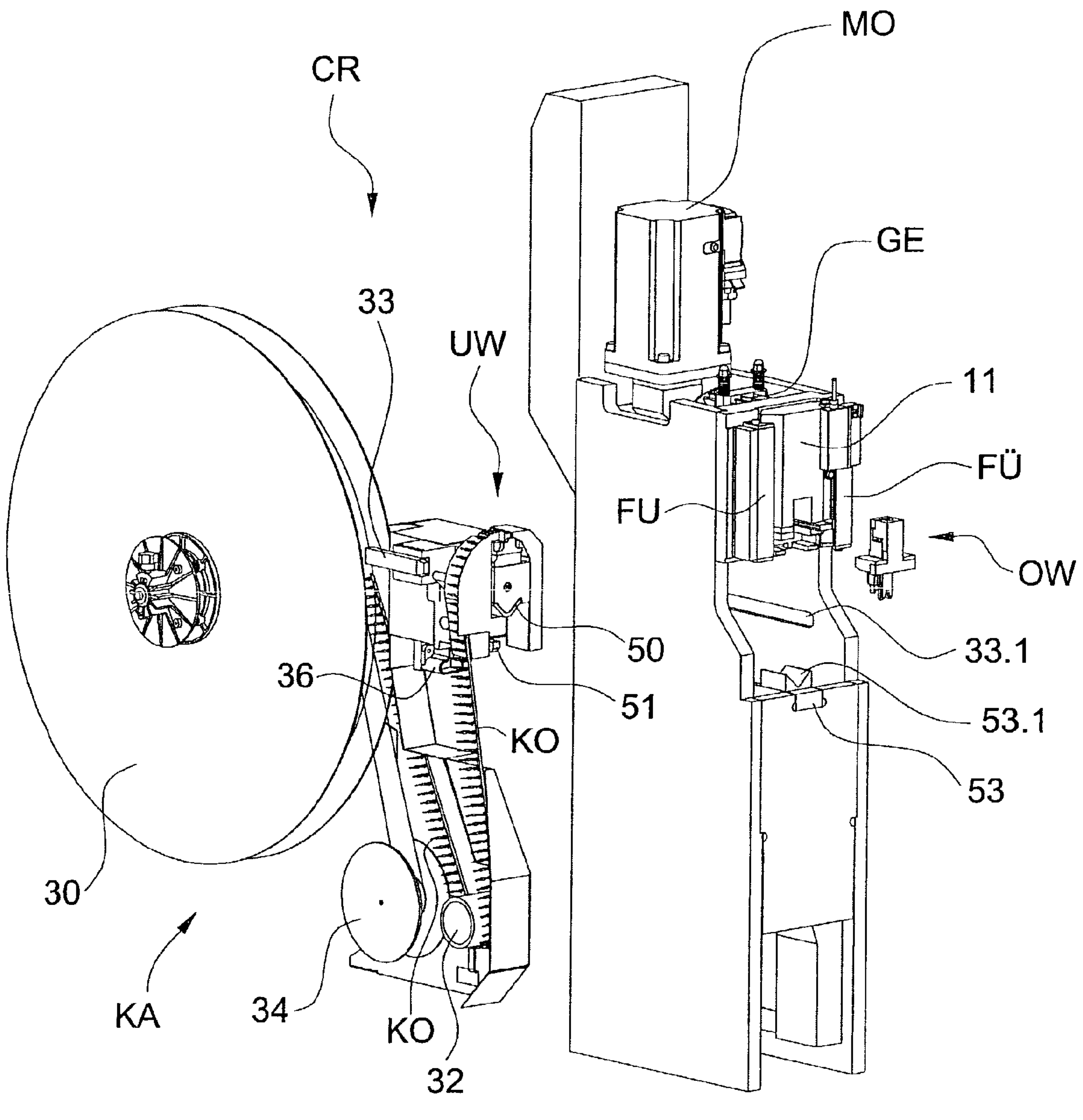
FIG. 2 is a perspective view similar to FIG. 1 with the cassette removed and the upper tool removed.

FIGS. 1 and 2 show a crimping press CR according to the present invention. FIG. 2 shows the crimping press CR with a cassette KA removed and with an upper tool OW removed. A motor MO drives a gear GE. On an output side of the gear GE is an eccentric device which converts the rotational motion of the motor MO and the gear GE into a linear up-and-down motion which can be transmitted to a pressing slider 11 guided by means of guides FU.

Figure 3:
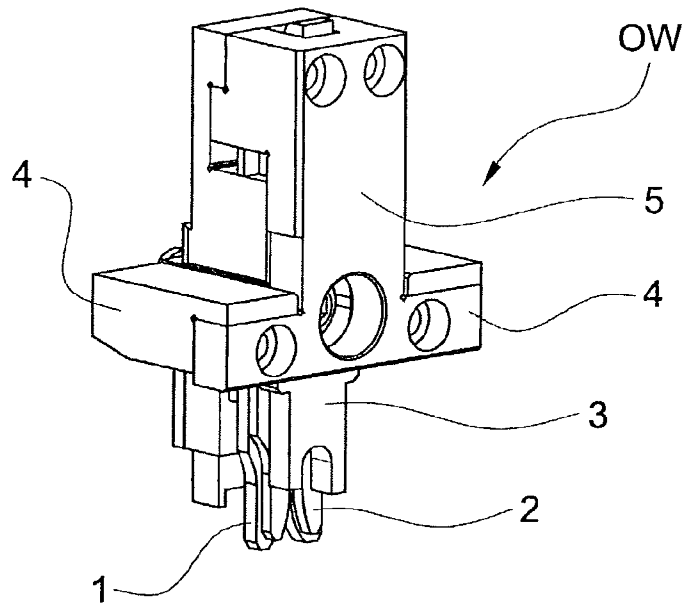
FIG. 3 is a perspective view of the assembled upper tool from the front.
Figure 4:
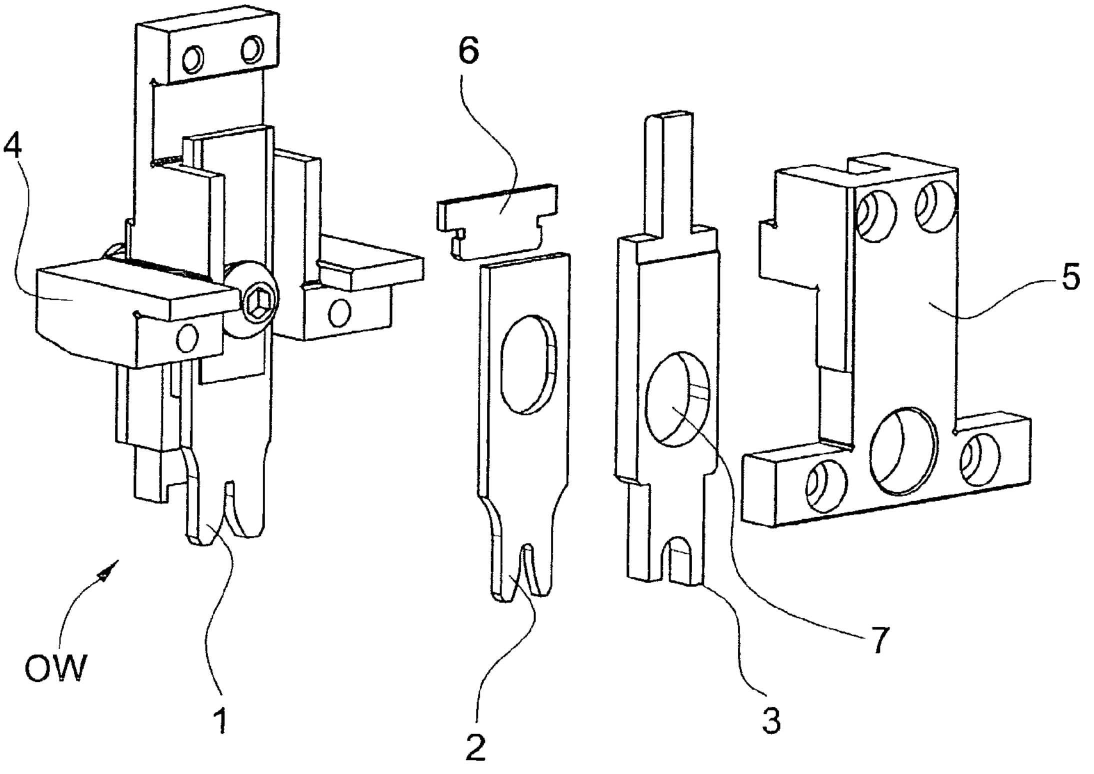
FIG. 4 is a perspective view of the upper tool in an exploded view.

FIG. 3 and FIG. 4 show details of the upper tool OW, which encompasses parts subject to wear such as a wire crimper 1, an insulation crimper 2, and a cutting punch 3. Depending on the crimped contact to be processed, further wear parts and distance plates may be necessary. The wire crimper 1 is bolted tightly to a holder 4, the remaining wear parts inserted, and the upper tool OW closed with a front plate 5. To adjust the height of the insulation crimping, a distancing piece 6 is exchangeable. The cutting punch 3 is supported in the upper tool OW in vertically movable manner, its motion being limited by the dimensions of an oval hole 7 formed in the body.

Figure 5:
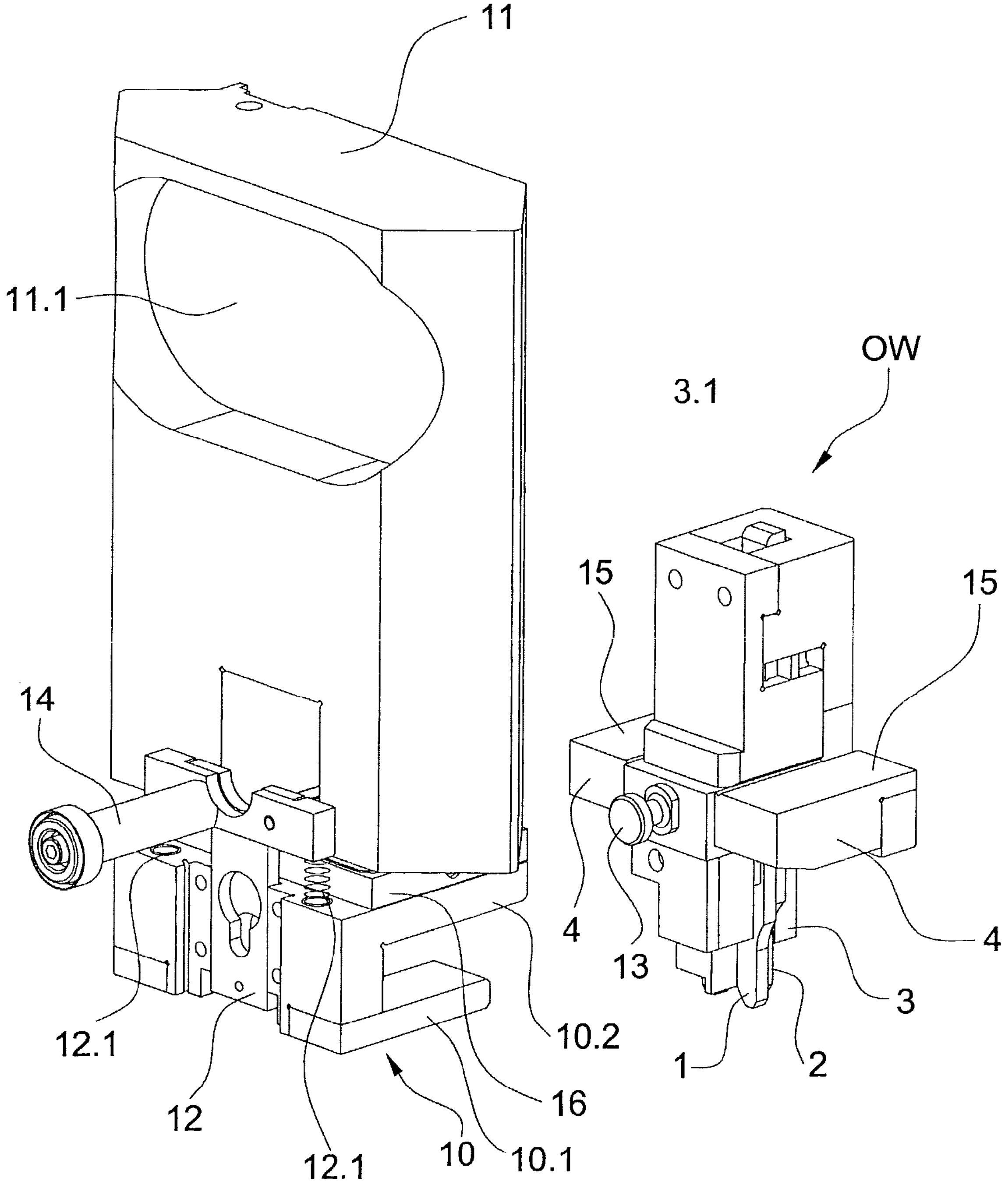
FIG. 5 is a perspective view of a tool receptacle for the upper tool.

As seen in FIG. 5, provided at the upper end of the pressing slider 11 is an opening 11.1 in which an eccentric pin of the eccentric drive engages, thereby converting the rotary motion of the eccentric pin into a linear up-and-down motion of the pressing slider 11.

The upper tool OW is inserted manually into a tool receptacle 10 arranged at the lower end of the pressing slider 11, and held against a pin 13 by means of a latch 12. When tool-changing, the latch 12, which is pushed upward by a pair of compression springs 12.1, is pushed downward by means of an extensible piston 14. For this purpose, the piston 14 must be extended, and the pressing slider 11 must execute a vertical motion in an upward direction.

Via supporting surfaces 15 of the upper tool OW, forces arising during crimping are transmitted to a force sensor 16 located between the receptacle 10 and the slider 11.

Figure 6:
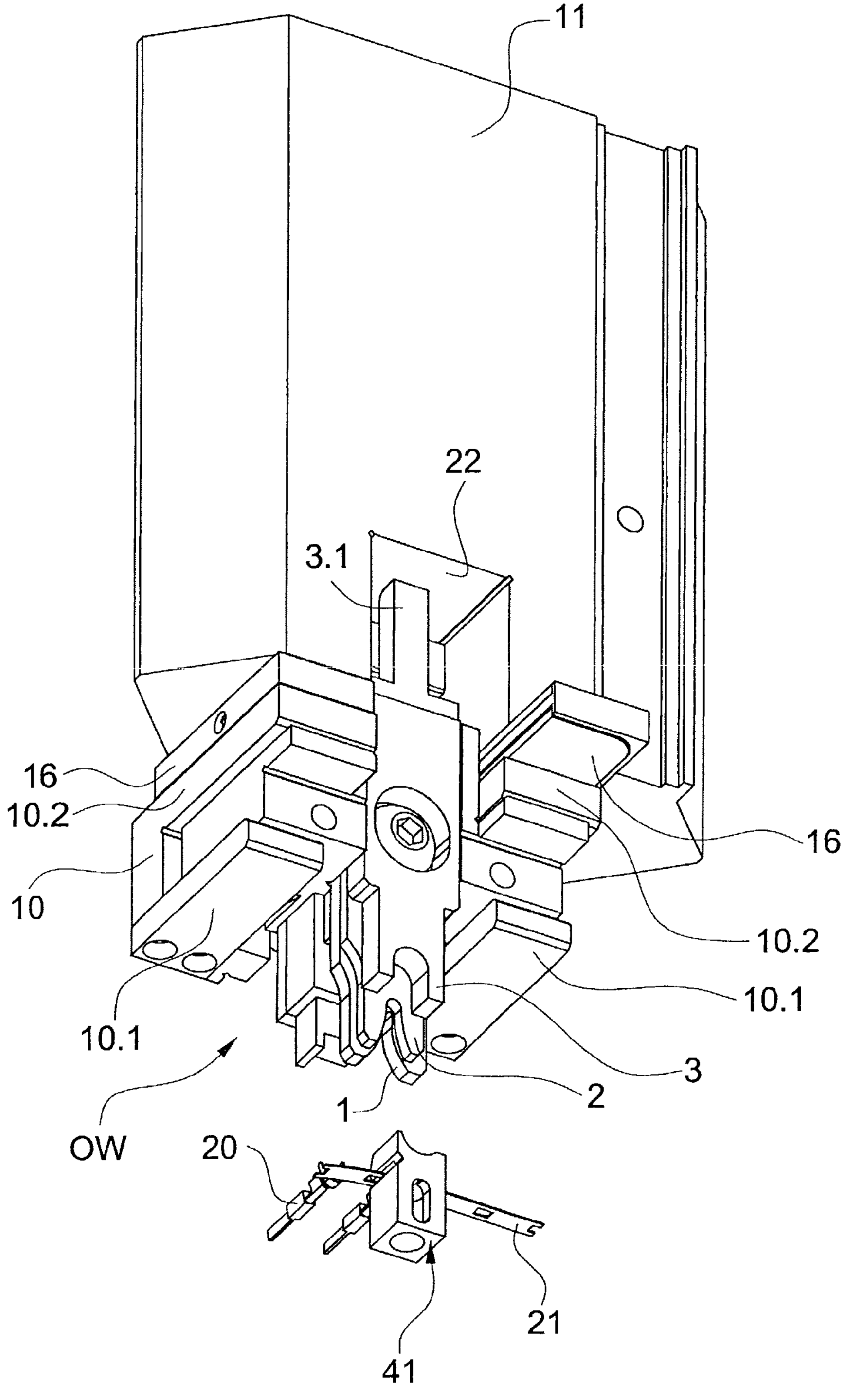
FIG. 6 is a perspective view of the upper tool inserted in the tool receptacle.

FIG. 6 shows the upper tool OW inserted in the fork-shaped tool receptacle 10, the upper tool OW being held by means of a lower fork 10.1 and by means of an upper fork 10.2. In a crimping operation, the cutting punch 3 actuates a cutter 41 of a lower tool UW, by means of which cutter 41 a crimp contact 20 is separated from a carrier belt 21, and the carrier belt 21 fragmented. The forces arising when this is done do not pass through the force sensor 16, because the cutting punch 3 can move vertically in the upper tool OW, and lies with its extension 3.1 directly against a body 22 of the pressing slider 11.

As seen in FIG. 2, the cassette KA, which is insertable from the rear of the crimping press CR, encompasses a contact roll 30 which contains the supply of belted crimp contacts 20. A contact belt KO passes over a tension pulley 32 and, being twisted through 90°, is guided onto the lower tool UW. A paper-tape reel 34 is driven via a toothed pulley by a mating gear located in the crimping press CR.

Vertically spring-loaded guide bars 33 arranged at both sides serve to insert the cassette KA into the crimping press CR for cassette changing, the guide bars 33 being guided in guides 33.1 of the crimping press CR. On insertion, the cassette KA is connected pneumatically and electrically to the crimping press CR by means of a quick-change plug connector 36.

Figure 7:
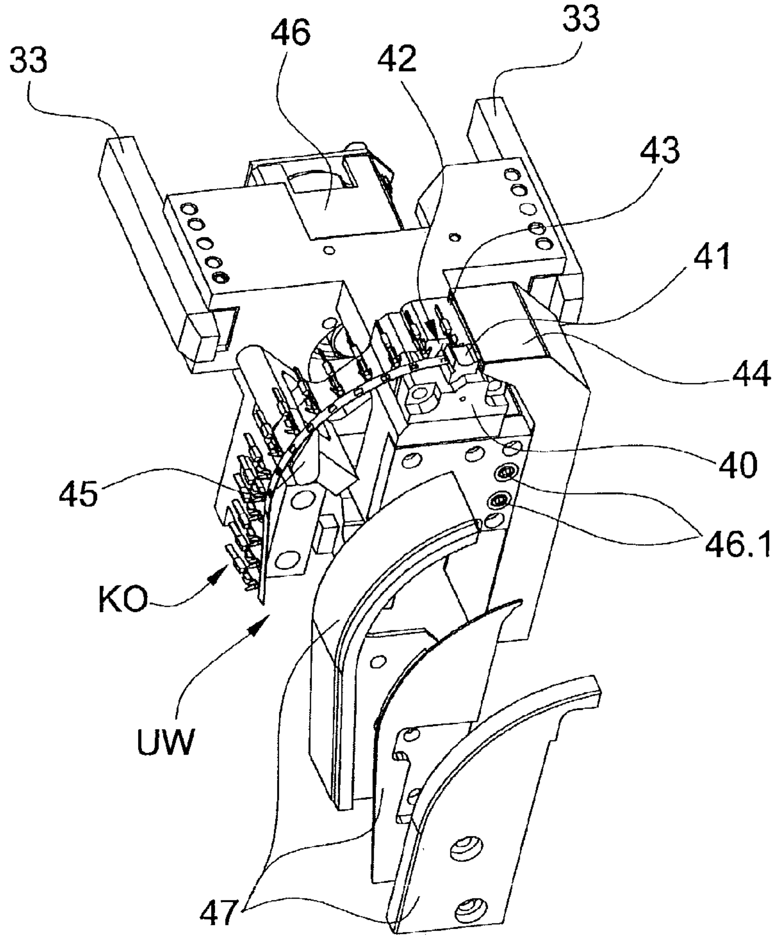
FIGS. 7 and 8 are perspective views and FIG. 9 is a cross-sectional view of details of a lower tool.
Figure 8:
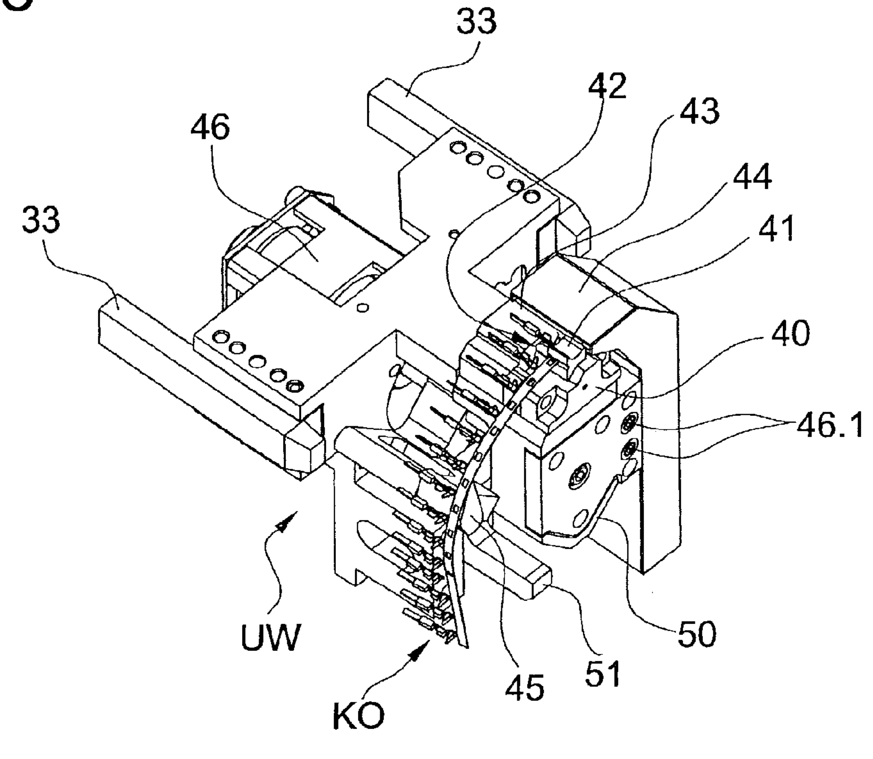
Figure 9:
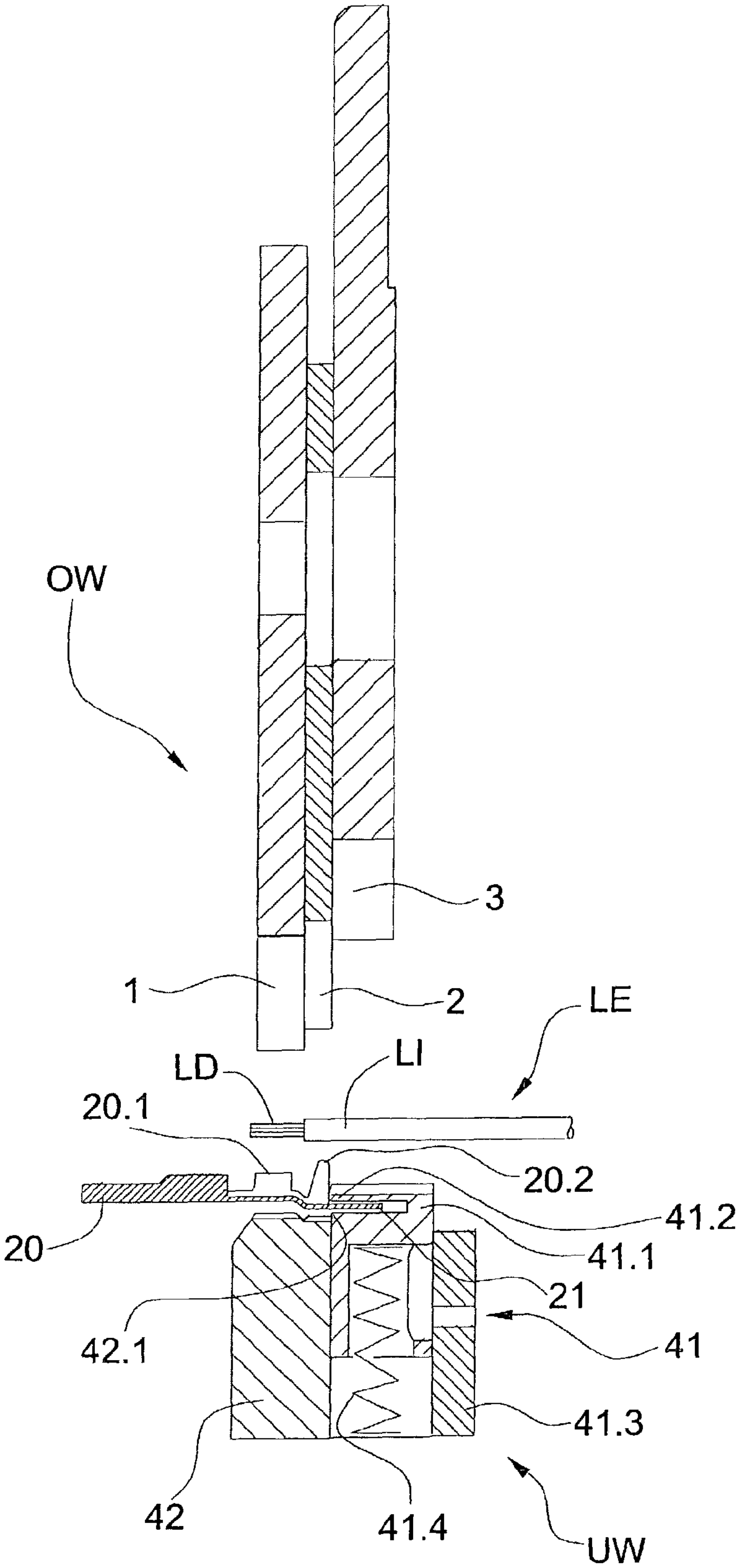

FIGS. 7, 8, and 9 show details of the lower tool UW comprising a vertical cutter guide 40, a cutter 41 for separating the crimp contacts 20 from carrier belt 21 and for fragmenting the carrier belt 21, an anvil 42 for producing a crimped connection, and a contact surface 43 for guiding the crimp contacts 20. The fragmented carrier belt 21 falls into a waste pipe 44.

Advancing of the crimp contacts 20 is performed by a swiveling movement of an advancing finger 45. This finger 45 engages in transporting holes of the carrier belt 21, and takes the form of a spring-loaded catch which only pushes the contacts 20 forward when it swivels upward. The two end-positions of the swiveling movement can be set with a pair of setting screws 46.1, which determine the end-positions of a pneumatic advancing drive 46. Swiveling and guiding the contact belt KO while being advanced is performed by a plurality of guides 47. These guides 47 are collectively adjustable in the direction of the belt, so that the position of the crimp contact 20 on the lower tool UW, and on the anvil 42, can be determined with precision.

The crimped connection is produced by means of the upper tool OW and lower tool UW, the upper tool OW by means of a linear motion crimping onto an end of a conductor LE the crimp contact 20 which can be laid on the lower tool UW. This is shown in detail in FIG. 9. The crimp contact 20 attached to the carrier belt 21 has lugs 20.1 for the wire crimp, and lugs 20.2 for the insulating crimp, the lugs 20.1 and 20.2 being plastically deformed by means of the wire crimper 1 and the insulation crimper 2 respectively, and after the crimping operation tightly encircling the wire LD and the insulation LI respectively. The cutter 41 for separating the crimp contact 20 from the carrier strip 21 comprises a slider 41.1, with a cutting edge 41.2, and a non-moving cutting block 41.3 with spring 41.4. In the crimping operation, the cutting punch 3 moves the slider 41.1 downward against the spring force of the spring 41.4, and separating the crimp contact 20 by means of the cutting edge 41.2 and by means of a cutting edge 42.1 of the anvil 42.

Figure 10:
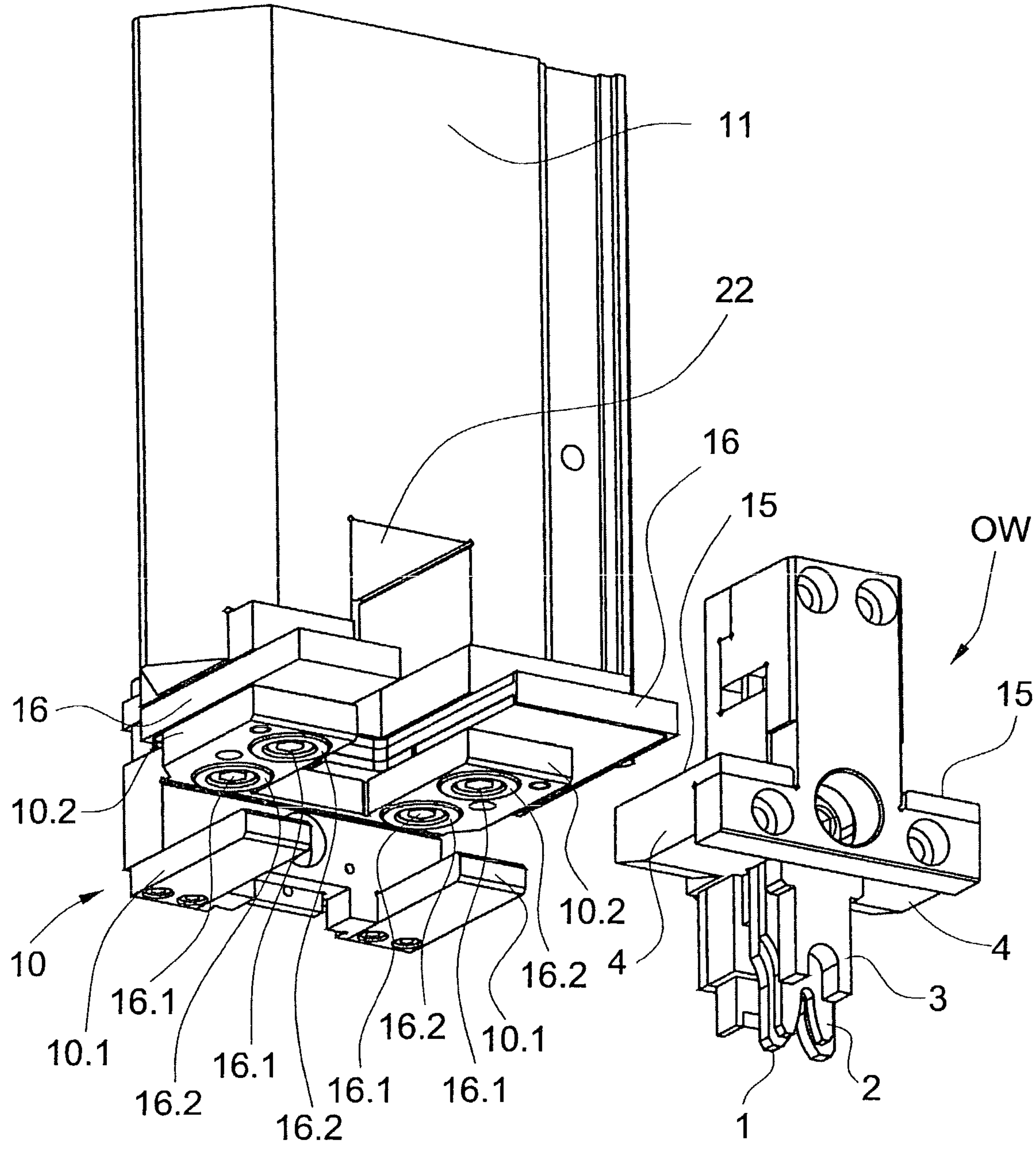
FIGS. 10 and 11 are perspective view and FIG. 12 is a cross-sectional view of details of a tool receptacle with a force-sensing device arranged at the lower end of a pressing slider.
Figure 11:
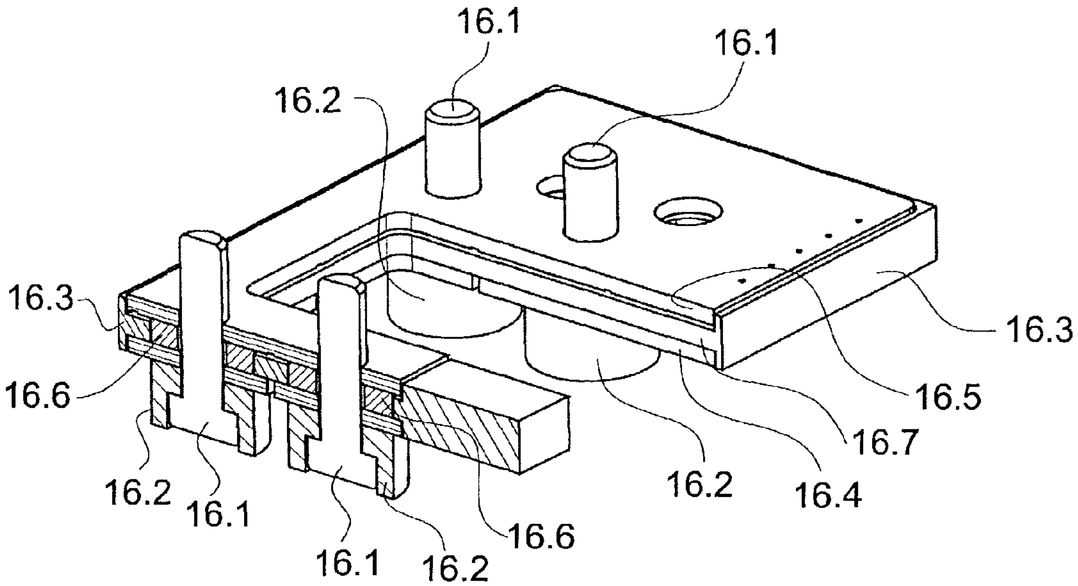
Figure 12:
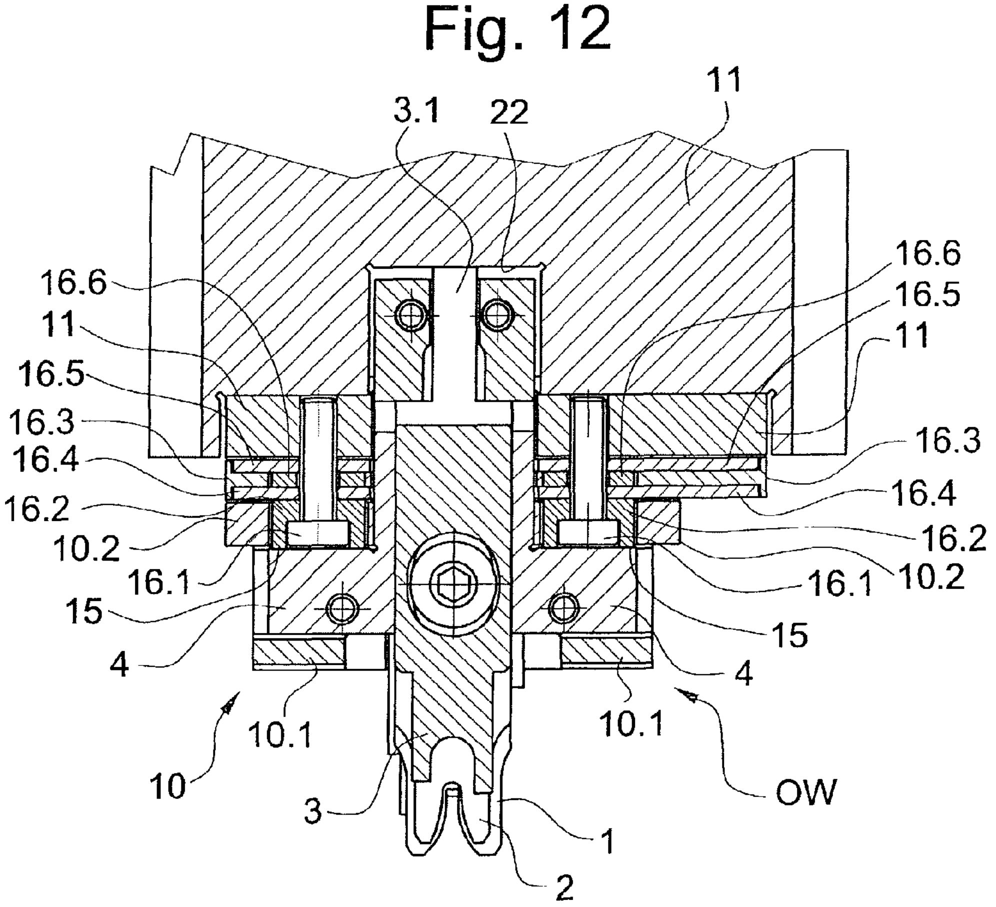

FIGS. 10, 11, and 12 show details of the tool receptacle 10 arranged at the lower end of the pressing slider 11 with the force-sensing device 16. The forces arising during the crimping operation are transmitted from the supporting surfaces 15 of the upper tool OW to several points on the force-sensing device 16. In the present example, provided on each side of an upper fork 10.2 and held by screws 16.1 are two collars 16.2, the crimping forces on either side of the supporting surface 15 being transmitted to the two collars 16.2. On each side, more or less than two collars 16.2 can also be provided. With their heads, the screws 16.1 hold the collars 16.2, while with their other ends the screws 16.1 are screwed into the pressing slider 11.

The force-sensing device 16 consists of a sensor housing 16.3 with a base 16.4 and cover 16.5, each collar 16.2 having one sensor element 16.6. The base 16.4 and the cover 16.5 are formed of non-conducting material. The supporting surfaces of the sensor elements 16.6 on the inner sides of the base 16.4 and the cover 16.5 are laminated with an electrically conducting layer, for example a copper layer. The layer of the base 16.4 is connected by spring contact to the internal conductor of a connecting socket. The casing of the connecting socket is connected directly to the coating of the cover 16.5. The sensor housing 16.3 has an intermediate layer 16.7 with a thickness less than that of, for example, the sensor element 16.6 in the form of a piezo-ceramic wafer. The forces exerted during the crimping operation on the base 16.4 are transmitted only to the sensor elements 16.6, and from these to the cover 16.5. The pressure on the sensor elements 16.6 generates on each sensor element 16.6 an electric charge, which can be measured on the connecting socket of the respective sensor element 16.6. The separate registering of the crimping forces at, for example, four points enables good information to be given regarding the crimping quality of the crimped connection on the wire, and of the crimped connection on the insulation.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A crimping press for producing a crimped connection with an upper tool and a lower tool, the upper tool being movable in a linear motion to crimp a contact onto an end of a conductor which contact is laid on the lower tool, comprising: a pressing slider slidably mounted on a crimping press for linear movement toward and away from a lower tool mounted on said crimping press; and an upper tool arranged on said pressing slider for movement therewith, said upper tool cooperating with said lower tool to crimp a contact onto an end of a conductor.

2. The crimping press according to claim 1 including a tool receptacle on said pressing slider into which said upper tool is inserted and means for latching said upper tool in said tool receptacle.

3. The crimping press according to claim 2 wherein said tool receptacle includes a force-sensing device for sensing crimping forces arising in said upper tool.

4. The crimping press according to claim 3 wherein said force-sensing device includes at least two sensors for sensing the crimping forces.

5. The crimping press according to claim 4 wherein said sensors are arranged between a base and a cover of a sensor housing, said base and said cover each having an electrically conducting coating on an inside surface contacting a supporting surface of each of said sensors.

6. The crimping press according to claim 2 wherein said upper tool has a wire crimper, an insulation crimper, and a cutting punch with an extension, said wire crimper and said insulation crimper being fixed to a holder fitting into said tool receptacle, and said cutting punch being supported in vertically movable manner on said holder, and said cutting punch being actuatable by said pressing slider through said extension.

7. The crimping press according claim 2 wherein said tool receptacle arranged on said pressing slider has a lower fork and an upper fork holding said upper tool and wherein said force-sensing device is between said upper fork and said pressing slider.

8. A crimping press for producing a crimped connection comprising:

a crimping press;

a lower tool mounted on said crimping press;

a pressing slider slidably mounted on a crimping press for linear movement toward and away from said lower tool; and an upper tool arranged on said pressing slider for movement therewith, said upper tool cooperating with said lower tool to crimp a contact onto an end of a conductor.

9. The crimping press according to claim 8 including a tool receptacle on said pressing slider into which said upper tool is inserted and means for latching said upper tool in said tool receptacle.

10. The crimping press according to claim 9 wherein said tool receptacle includes a force-sensing device for sensing crimping forces arising in said upper tool.

11. The crimping press according to claim 10 wherein said force-sensing device includes at least two sensors for sensing the crimping forces.

12. The crimping press according to claim 11 wherein said sensors are arranged between a base and a cover of a sensor housing, said base and said cover each having an electrically conducting coating on an inside surface contacting a supporting surface of each of said sensors.

13. The crimping press according to claim 9 wherein said upper tool has a wire crimper, an insulation crimper, and a cutting punch with an extension, said wire crimper and said insulation crimper being fixed to a holder fitting into said tool receptacle, and said cutting punch being supported in vertically movable manner on said holder, and said cutting punch being actuatable by said pressing slider through said extension.

14. The crimping press according claim 9 wherein said tool receptacle arranged on said pressing slider has a lower fork and an upper fork holding said upper tool and wherein said force-sensing device is between said upper fork and said pressing slider.

* * * * *